(No Model.)
H. R. ROBBINS, Jr.
APPARATUS FOR TREATING CEREALS.
No. 378,806. Patented Feb. 28, 1888.
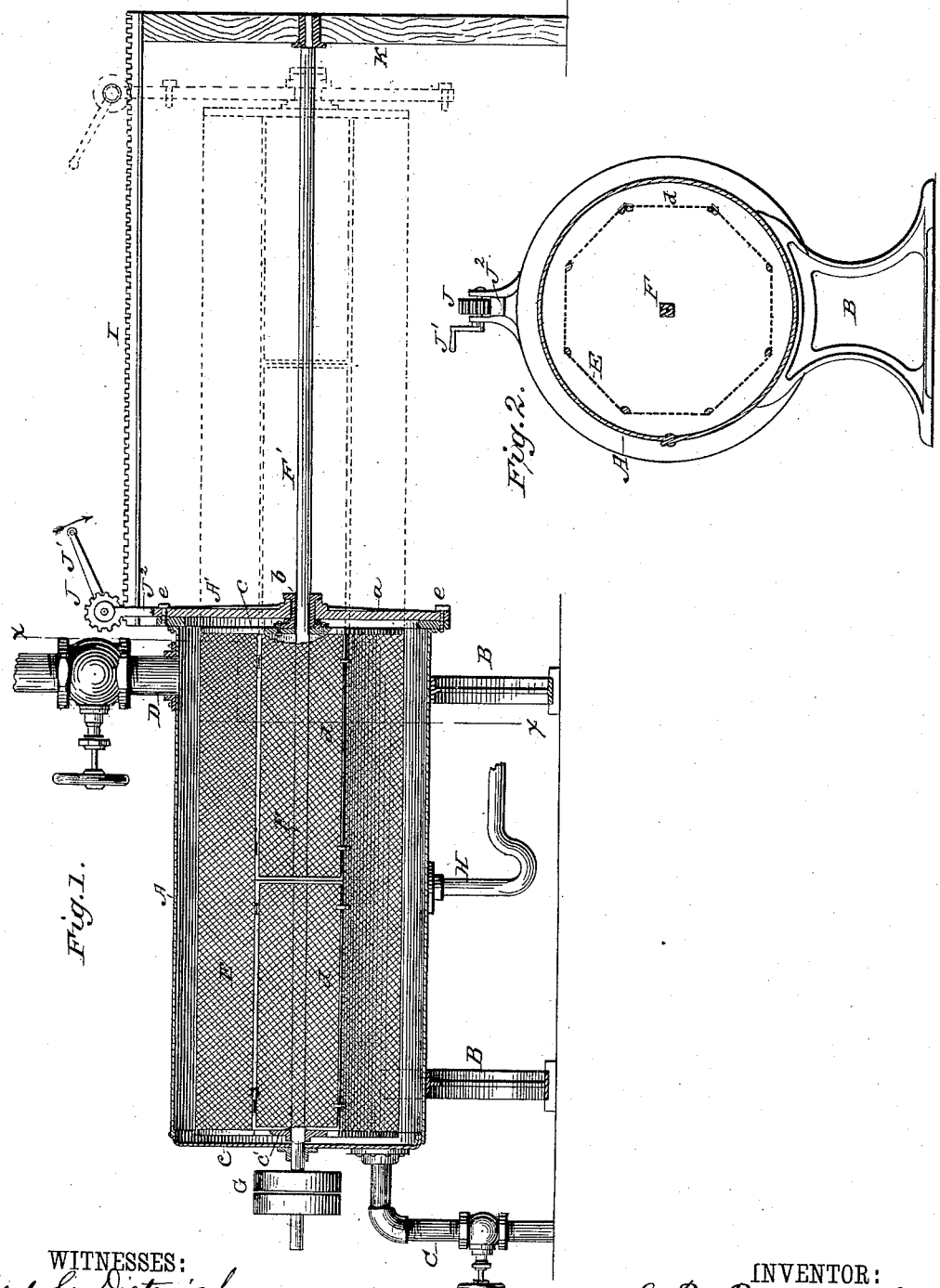
WITNESSES:
Fred G. Dieterich
Edw. W. Byrn
INVENTOR:
H. R. Robbins Jr.
BY Munn & Co.
ATTORNEYS.

UNITED STATES PATENT OFFICE.

HENRY R. ROBBINS, JR., OF BALTIMORE, MARYLAND, ASSIGNOR OF ONE-HALF TO CHAUNCEY M. BENNINGHAUS, OF SAME PLACE.

APPARATUS FOR TREATING CEREALS.

SPECIFICATION forming part of Letters Patent No. 378,806, dated February 28, 1888.

Application filed September 20, 1887. Serial No. 250,250. (No model.)

*To all whom it may concern:*

Be it known that I, HENRY R. ROBBINS, Jr., of Baltimore city, in the State of Maryland, have invented a new and useful Improvement in Apparatus for Treating Cereals, &c., of which the following is a specification.

The object of my invention is to provide an apparatus for conveniently and efficiently treating cereals by steam with reference to the production of a new food product of a "coralline" shape, the process for the production of which was patented by me, in connection with John Solter as joint inventor, under date of May 4, 1886, No. 341,355.

My invention relates to means for cooking the cereals with steam in accordance with that process; and it consists in the peculiar construction and arrangement of devices for conveniently and expeditiously charging and discharging the receptacle and economically and uniformly treating the materials.

Figure 1 is a side elevation partly in section; and Fig. 2 is a vertical cross-section taken through line $x\ x$ of Fig. 1.

In the drawings, A represents a stationary cylindrical shell, of boiler-iron, mounted upon legs B B, and having at one end, near the bottom, an inlet-pipe, C, with valve for admission of steam, and at the opposite end, at the top, an outlet-pipe, D, of somewhat larger diameter, also provided with a valve. Through the pipe C steam is admitted, and through pipe D it is allowed to escape after passing through the cylinder; and the steam which I prefer to use is, for economical reasons, the exhaust-steam from the engine of the works, as I find that this possesses sufficient heat and pressure to carry out the process. I may, however, use live steam from a special boiler, if desired.

F F' is a rotary shaft arranged in bearings in the heads of the cylinder, and also in a standard, K. This shaft is provided with tight and loose pulleys, as at G, to which motion is transmitted through a belt from any prime mover. Mounted upon the shaft, within the cylinder A, is a reel or cage, E, having tight heads and a covering of wire-netting, to the interior of which access may be had through doors $d\ d$. This reel is arranged to revolve in the cylinder with the shaft, and also to slide on said shaft from its position in the cylinder to a position outside of the cylinder, as shown in dotted lines, when charging it with fresh grain or discharging the cooked grain therefrom. To accomplish this the end F of the shaft which is in the cylinder is squared or angular, while the portion F' outside the cylinder is round. The head $c'$ of the reel E is formed with a square perforation fitting the squared shaft, so as to turn rigidly with it, but slide freely on it. Any other cross-section of shaft and shape of hole may, however, be used which will cause the shaft to impart its rotation to the reel and still allow an independent sliding motion. The other head, $c$, of the reel is bolted or securely fastened to a flanged sleeve, $b$, which embraces the round part of the shaft and turns in a stuffing-box in the head A' of the outer cylinder. This head A' is bolted to a flange of the outer cylinder, and is also connected to hangers $J^2$, which carry a pinion, J, which runs upon the toothed rack-bar I and is provided with a crank-handle, J'. This rack-bar is sustained in horizontal position, being supported at one end upon the cylinder and at the other upon the standard K.

H is a trapped pipe, through which any water of condensation may be expelled.

The operation of my device is as follows: The reel E being partially filled with its charge of grain or cereals, steam is allowed to enter at C and pass out at D, the steam passing through being spread or distributed by the imperforate head $c$ of the reel, which as it revolves constantly brings fresh portions of the material to the influence of the steam, which soon cooks the charge uniformly and without disintegrating the grains or losing any of the substance thereof. As soon as the charge is sufficiently treated the steam is shut off by valve in pipe C and the head A' of the cylinder is disconnected from the cylinder by removing bolts $e$. The crank-handle J' being now turned in the direction of the arrow, the pinion J travels on the rack I and draws the cylinder-head A', and with it the swiveling sleeve $b$ and attached reel, along upon the shaft until the reel occupies the position indicated by the dotted lines, and when in this position the doors *d d* are opened and the charge dumped upon the floor or into a receptacle provided for it. A fresh charge is now put in, the reel returned to the cylinder, the head A' secured, steam turned on, and rotary motion again transmitted to the shaft for a repetition of the same action.

My invention is designed, primarily, for the preparation of cereals by steaming for food purposes and for brewing, but is not limited thereto, as it may be used generally for treating materials by steam which require to be stirred under treatment. By simply passing hot dry air through pipe C (instead of steam) the same device may be used for drying grain, fruits, vegetables, &c.; or, if the cylinder A be placed above a furnace, my invention may be employed for roasting coffee, peanuts, &c.

Having thus described my invention, what I claim as new is—

1. The combination, with a fixed cylinder, A, having independent inlet and outlet steam-pipes C and D, provided, respectively, with valves, of a rotary shaft extending through said cylinder and beyond the end thereof, and a reel or cage connected to the shaft for rotation therewith, and arranged, as described, to slide out of the cylinder upon the shaft, substantially as and for the purpose described.

2. The combination, with a fixed cylinder, A, of a rotary shaft extending through said cylinder and beyond the end thereof, and having its portion within the cylinder angular and the portion outside round, a reel or cage having one head fitted to slide on the angular portion of the shaft, a swiveling sleeve attached to the other head and fitted upon the round portion of the shaft, and a head, A', for the outer cylinder encompassing the swiveling sleeve, substantially as shown and described.

3. The combination, with the stationary cylinder, the elongated shaft, and the reel sliding thereon, of a head, A', for the cylinder, having a swiveled connection with the reel, hanger-bars J², pinion J, with crank-handle, and rack-bar I, substantially as and for the purpose described.

HENRY R. ROBBINS, JR.

Witnesses:
E. F. LEGH,
WM. RAINE.